United States Patent [19]

Minschart

[11] Patent Number: 4,994,975

[45] Date of Patent: Feb. 19, 1991

[54] PROCESS AND APPARATUS FOR REGISTER ADJUSTMENT OR MAINTENANCE, WITH AUTOMATIC INITIAL REGISTER ADJUSTMENT, OF A WEB OF PREPRINTED MATERIAL

[76] Inventor: Marc G. Minschart, Hockeylaan 15, B-1940 Zaventem, Belgium

[21] Appl. No.: 260,268

[22] Filed: Oct. 20, 1988

[30] Foreign Application Priority Data

Oct. 20, 1987 [BE] Belgium ............................ 08701190

[51] Int. Cl.[5] ....................... G06F 15/46; B65H 23/18

[52] U.S. Cl. .................................... 364/469; 364/470; 364/178; 101/248

[58] Field of Search ............... 364/469, 470, 471, 561; 493/34; 318/603; 340/721; 226/9; 101/484, 248, 181

[56] References Cited

U.S. PATENT DOCUMENTS

| | | | |
|---|---|---|---|
| 3,594,552 | 7/1971 | Adamson et al. | 239/92 CC |
| 3,601,587 | 8/1971 | Thiede | 235/92 CC |
| 3,914,582 | 10/1975 | Coberley et al. | 235/92 MP |
| 4,243,925 | 1/1981 | Gnuechtel | 318/603 |
| 4,318,176 | 3/1982 | Stratton | 364/469 |
| 4,366,753 | 1/1983 | Glanz et al. | 101/181 |
| 4,553,478 | 11/1985 | Greiner et al. | 101/426 |
| 4,719,575 | 1/1988 | Gnuechtel | 364/469 |

FOREIGN PATENT DOCUMENTS

| | | |
|---|---|---|
| 0183336 | 6/1986 | European Pat. Off. . |
| 0225727 | 6/1987 | European Pat. Off. . |
| 2643481 | 3/1978 | Fed. Rep. of Germany . |
| 1058511 | 2/1967 | United Kingdom . |
| 2088100 | 6/1982 | United Kingdom . |

*Primary Examiner*—Jerry Smith
*Assistant Examiner*—Paul Gordon
*Attorney, Agent, or Firm*—Oblon, Spivak, McClelland, Maier & Neustadt

[57] ABSTRACT

Process of register adjustment or maintenance by means of register marks and an index pulse of the processing element, in which a position pulse train indicates the instantaneous position and the speed of the processing element during each of its cycles. It is essentially characterized in that, to allow an automatic initial register adjustment and maintenance, it consists in determining and storing, in the form of numerical sequence, at least one characteristic of a selected register mark, in continuously picking up the signal of a detector, in sampling this signal synchronously from the position pulses, between the index pulses, and in writing the results in memory, in the form of numerical values, at successive addresses, in periodically analyzing the memory contents to locate in it the sequence of numerical values corresponding best to that determined as a function of the selected register mark in calculating, from a specific address of said sequence, and from the position of the processing element associated with it, the deviation between the actual position and the set point of the register mark and, from the deviation thus calculated, in applying the desired correction to bring the deviation to zero. The invention is particularly useful in off-line machines processing a web of preprinted material.

9 Claims, 3 Drawing Sheets

PROCESS AND APPARATUS FOR REGISTER ADJUSTMENT OR MAINTENANCE, WITH AUTOMATIC INITIAL REGISTER ADJUSTMENT, OF A WEB OF PREPRINTED MATERIAL

BACKGROUND OF THE INVENTION

Field of the Invention

The invention relates to a process of register adjustment or maintenance, with automatic initial register adjustment, of a web of preprinted material in processing machines.

By initial register adjustment is understood here the process during which, at each starting or restarting of the processing machine, the preprinted web and the processing tool are initially brought into register, i.e., under such a condition that the tool acts at each cycle at the desired point of the web, relative to the preprinted format that it carries. This register adjustment therefore implies, on the one hand, synchronization of the tool and web and, on the other hand, adjustment in position (generally angular, the tool being rotary) of the tool relative to the web.

In the art of printing and processing, or more generally of processing of a web of material, and to perform several operations on the same web of material, two types of machines are essentially known, namely, "on-line" machines and "off-line" machines.

On-line machines are machines, in which a blank web is processed at the beginning, and the web passes in successive work stations along a continuous path, in an essentially taut state, while the various tools are operated by the same shaft.

The "off-line" machines are machines in which a web that has already undergone a processing (generally a printing) is processed in a machine with one or more independent work stations.

The problems that on-line machines and off-line machines pose are fundamentally different.

The on-line machines are essentially stable by design, with the elements being in perfect synchronization with the printed pattern, because the printing groups are mechanically keyed on the same drive shaft as the processing tools. Performing all the operations at the same time on a blank web at the beginning avoids all the problems of register readjustment during restarting after a stop, accidental or not.

Once the machine has been adjusted so that the successive tools (starting from the 2nd, the first working on a blank web) will be in register with the web, the inevitable variations will occur in one direction and the other, around the position in correct register, even in the absence of any correction.

On the other hand, the off-line machines have an essentially unstable positioning. Essentially two problems arise for register adjustment of such a machine. First, it is necessary to make the speed of the web and the speed of the tools correspond to have one rotation of the tool for one advance of a paper printing (speed error) This problem has several origins, for example:

there is always slippage between the web and driving rollers, the mechanical development of the machine is constant, while the length of repetition of the printing varies inside the same reel, and with greater variance during a large printing (group of reels).

Secondly, the processing tools must be brought into correct position relative to the printing (position error).

This problem is more significant in such an off-line machine. Actually, it is practically impossible, for example, to run or initially insert the preprinted web in register, which means that, after a break in the web for example, it is necessary to perform a new register adjustment.

Without an automatic correction system, the register of such a machine drifts as a function of the slippage, of the repetitive printing length and the like.

Once adjusted, the on-line machines essentially no longer have an adjustment problem, even after a stop or incident (paper break), all the stations in practice being "locked" relative to one another by the initial adjustment.

Such adjustment systems are known in the art, for example, from Adamson et al, U.S. Pat. No. 3,594,552 and Stratton et al, U.S. Pat. No. 4,318,176.

In a blank zone of the web there are placed register marks used to determine the position of the formats printed on the web relative to the working elements assuring the processing. These register marks have the form of printed marks, surrounded by blank printing zones, and photoelectric cells are placed in the machine, opposite the path of the marks, while an encoder is attached to the drive shaft of the working element.

The encoder supplies pulses whose relative position and frequency are linked to the position and speed of the working element, and these pulses are used to activate the signal of the photoelectric cell in a "window" extending over a predetermined distance on both sides of the ideal position or set point of the register mark relative to the working element.

The signal of the cell is analyzed in the window, in analog form, by a processor that identifies, relative to a background signal of the blank margin, the signal due to the register mark, a determination as to any deviation between the actual position and the set point position of the register mark is made, and then any correction to bring the register mark to the set point position is made.

This type of adjustment system assures a correct positioning of the register mark, and therefore a correct maintenance of the register adjustment, in the on-line machines, whose functioning is essentially stable, as is stated above, which causes the register mark, of course, to be kept within the limits of a rather narrow window on both sides of the register position.

The problem posed by off-line machines processing a preprinted web is basically different in that the functioning of such a machine is essentially unstable, as is stated above.

In known adjustment systems, of the abovementioned type, the processor which makes the adjustment may work in only a limited window, and therefore these types of systems do not allow automatic initial register adjustment, but, on the contrary, require a manual register adjustment, at least approximately so as to set the "window". Considering the unstable nature of off-line processing, the register mark constantly tends to leave this predefined window and, as soon as the register mark has left the window, the adjustment process must be stopped, to make a new approximate manual register adjustment of the window. This is the case after a break of the web as well. This obviously is costly in time and materials (spoilage of the preprinted web).

Therefore there is a need for a process and apparatus for assuring an automatic register adjustment, or an initial register adjustment, in an off-line machine working on a preprinted web, and assuring maintenance of the register adjustment under the unstable operating conditions of these machines.

To solve this problem and to make possible an automatic initial register adjustment, it is not sufficient to extend for a complete cycle the extent of the window in which the cell signal is analyzed. Actually, according to the prior art, analysis of the cell signal or other detector is limited to a window which is selected so that the register mark with the selected format appears there alone, in a quite distinct and isolated manner (for example, from other register marks of colors or the like also being able to be required for later printing and processing).

To solve this problem it is necessary therefore, besides extending the window for a complete cycle, to find a process and apparatus which makes it possible to identify reliably the format register mark relative to the background signal.

We also note that existing registers function only from a determined speed threshold (i.e., ±20% of maximum speed).

To minimize spoilage, it is advantageous to proceed to the register adjustment or readjustment at slow speed (i.e., ±3% of maximum speed), then to rise, in register, to the production speed.

Manual adjustment causes considerable spoilage. Further, it has the drawback of depending on the skill of the operator and, when the machine comprises a single shaft and several successive work stations, it is complicated by the fact that the upstream adjustment has an impact, of course, on the downstream stations, with the necessity of making this adjustment successively from upstream to downstream, which increases the spoilage and risks of error. Additionally, this operation must be repeated after each production accident such as a break in the web.

According to the invention, it is proposed to provide a process and apparatus of adjustment, with automatic initial register adjustment, of a preprinted web relative to a working element, operating independently of the machine speed, from the slow start of the machine to the maximum speed, and assuring the register adjustment after several operating cycles, to reduce the inevitable spoilage.

Besides simplifying the register adjustment and reducing spoilage, the process and apparatus of the invention makes it possible to identify one register mark among others, and easily to go from one register mark to another register mark, for example, of a different width, or again to define the register mark by a part of the printed format itself, so as to be able to eliminate the margin of the web which normally should remain free of printing, with the exception of the register marks, and thus reduce rejects of material.

It is important to stress here the difference between existing registers, which position a window relative to a register mark which are freely "chosen" from others, printed on a blank margin of the web, and the process of the invention, which identifies among others a register mark that is imposed by the operator, and that is not necessarily on a blank margin, but can be all or part of the preprinted format itself.

Actually, the known systems do not identify a specific register mark, but merely make the window move until there falls within it a printed mark giving a signal satisfactory for acting as a register mark (generally, a printed mark with a minimum blank zone on both sides). Generally, there will be several marks that are thus satisfactory over the length of the format and, in case of a considerable deviation, for example, the system can thus go from its register mark to another mark, giving an equivalent signal but causing a loss of register adjustment.

A purpose of the invention therefore is to provide a process of register adjustment or maintenance of a continuous web of material in a processing station of a machine, by means of register marks provided on the web, and an index pulse of the processing element of said station, in which a position pulse train is produced whose position relative to the index pulse is an instantaneous position measurement of the processing element during each of its cycles, and whose frequency is a measurement of its speed of movement, a detector signal is picked up, which is a function of a difference in characteristic between the background of the web and the marks that it carries, from which the deviation between the actual position and the set point position of the register mark is determined and, from the deviation thus determined, the desired correction to bring the deviation back to zero is applied. This process comprising, to allow automatic initial register adjustment and maintenance of a preprinted web, the steps of:

selecting a register mark over the length of the printed format, and determining its set point position, determining and storing, in the form of a numerical sequence, at least one characteristic of the register mark selected, acting on a detected signal, continuously sampling the detector signal synchronously with the position pulses, between the index pulses, and writing the results in memory, in the form of numerical values, at successive addresses, periodically analyzing the memory contents to locate in it the sequence of numerical values corresponding best to that determined as a function of the register mark selected, and calculating the deviation between the actual position and the set point position of the register mark from a determined address of said sequence and from the position of the processing element associated with it.

According to another feature of the process and apparatus of this invention, the characteristics of the register mark selected are its width, in the direction of travel of the preprinted web, and its shape, and there is calculated from its width the number of position pulses, and therefore of memory addresses, on which it extends, and a sequence of theoretical numerical values for the sampled detector signal are determined from its shape.

According to another embodiment of the process and apparatus of the invention, the characteristics of the selected register mark are its width, in the direction of travel of the preprinted web, and its color, and there is calculated from its width a number of position pulses, and therefore of memory addresses, on which it extends, and a sequence of theoretical numerical values for the sampled detector signal are determined from its color.

According to another embodiment, each index pulse causes the writing in memory of the subsequent numerical values to , successive addresses, whose origin is the start address of the memory.

According to another embodiment, analysis of the memory contents consists in calculating, in a first register adjustment mode, or initial register adjustment, at each address of the memory and over the extent of a complete cycle of the machine, from the central address of the sequence considered, a function of the sequence of the theoretical numerical values and of the sequence of actual numerical values, exhibiting a minimum or a maximum when the detected register mark exhibits the same width and the same shape or color as the predefined register mark, and in retaining the minimum of the minima or the maximum of the maxima associated with the corresponding address, the latter representing said desired central address.

According to another embodiment, since the operations of reading and writing in memory are exclusive, and analysis of the memory contents therefore interrupts the writing operation, analysis of the memory contents for a given cycle (i) begins after writing in memory, during this cycle, of the numerical value to which address (Xk) of the memory has been assigned which is the last of those corresponding to the analysis period, and therefore of nonwriting, of the preceding cycle (i−1), and the analysis is directed toward numerical values covering one cycle of the machine, and going from the following address (Xk+1) to said address (Xk), by considering the memory as a closed loop.

According to another embodiment, there is defined an adjustment zone extending over an interval exhibiting a predefined maximum deviation on both sides of the theoretical position of the register mark relative to the processing element and, when the correction has brought the register mark into this zone, the memory contents are analyzed, in a second adjustment mode, over a corresponding reduced zone.

According to yet another embodiment, the deviation between the closest value and the theoretical value is compared, and when this deviation is greater than a predefined value, the adjustment mode is deactivated to analyze the entire memory contents, according to the process of the register adjustment mode.

BRIEF DESCRIPTION OF THE DRAWINGS

Other aspects, embodiments and advantages of the invention will come out from the following description, with reference to the accompanying drawings which give, merely by way of example, an embodiment of the invention, and in which.

DETAILED DESCRIPTION OF THE PREFERRED EMBODIMENTS

Figure 1:
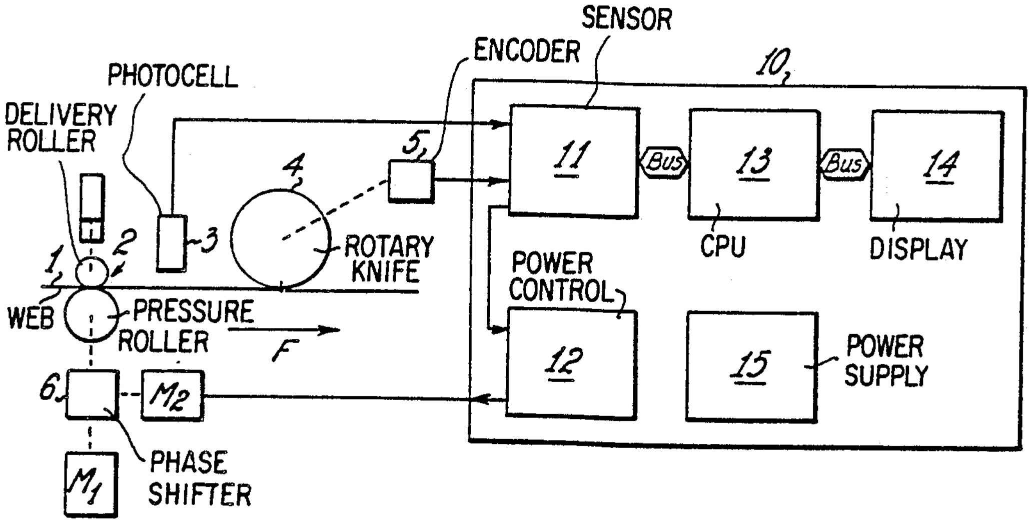
FIG. 1 is a diagrammatic representation of an embodiment of the invention.

Referring to FIG. 1, there is represented there diagrammatically a processing station of a processing machine (for example a cutting machine) of a preprinted web, in which a web 1 of preprinted material is delivered from a supply reel (not shown), and which goes in the direction of arrow F into a device 2 with a delivery roller and pressure wheel, then in front of a photoelectric cell 3, before reaching a rotary knife 4 which is mechanically coupled to an encoder 5.

The delivery roller of device 2 is driven by a motor M1, by a phase shifter 6 whose phase shift input is operated by a correction motor M2. Rotary knife 4 is driven in synchronization with motor M1.

The register adjustment is assured by register 10 essentially comprising a sensor 11, a power control 12 for correction motor M2, a processing unit (CPU) 13, an access and display device 14 for the operator, and a power supply 15.

Figure 2:
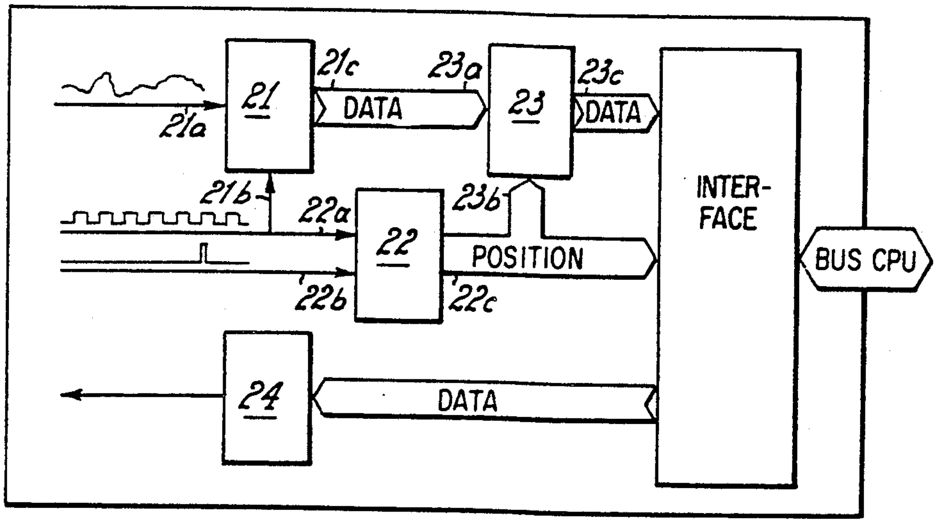
FIG. 2 is a more detailed diagram of a part of the register of FIG. 1.

In FIG. 2, unit 11 of the sensor is represented diagrammatically.

As can be seen in FIGS. 1 and 2, the signal of photoelectric cell 3, and the signal of encoder 5 are provided to sensor 11 which comprises a sampling circuit 21, which at its input 21*a* receives the signal of cell 3, samples it in synchronization with the pulses of the encoder, received at its input 21*b* and, by means of an analog-to-digital converter, provides at its output 21*c* a numerical value corresponding to the instantaneous amplitude of the signal of the cell.

The signals of the encoder consist of a train of identical position pulses extending over a revolution of the encoder, and an index pulse for each revolution of the encoder, and therefore of rotary knife 4 to which it is mechanically coupled in a 1/1 ratio.

The position pulse train of the encoder also supplies increment input 22*a* of counter 22, which provides at its output 22*c* a position and addressing signal to input 23*b* of memory 23 receiving at its input 23*a* the instantaneous numerical value of the signal of cell 3 for the corresponding pulse of the encoder. Each numerical value of the sampled signal is thus placed in memory at an address whose sequence number corresponds to that of the corresponding pulse of the encoder, and therefore to the position associated with rotary knife 4.

The index pulse of the encoder supplies reset input 23*b* of the counter, and causes resetting of the latter, the numerical values received at input 23*a* of the memory after an index pulse therefore being written from the first address of the memory, and replacing the values written during a preceding cycle.

Output 22*c* of the counter is also provided to the processing unit (CPU) 13, which controls the analysis of the memory.

The operations of writing and reading cannot be performed simultaneously in the memory 23. Therefore, during the successive cycles of the machine there is always, in the sequence of values written in memory, a limited sequence, or gap, of "residual" values, whose extent and position correspond to the duration and moment of analysis of the memory by processing unit (CPU) 13, during a preceding cycle, an analysis which occurred during which no value can be written.

To solve this problem of the gap in the memory, arrangement is made according to this invention for these residual values always be values written during the immediately preceding writing cycle. To do this, the processing unit initiates, during the writing cycle, analysis of the memory from the first significant value beyond the gap resulting from the preceding cycle, so that the gap moves from one cycle to the next in the memory.

Therefore if the analysis during the writing cycle (i−1) has interrupted the writing up to address Xk, analysis during cycle i will be initiated just after writing the new value at address Xk, and will be directed toward the sequence of addresses starting from Xk+i to reach Xk, by considering the memory as a closed loop.

This analysis, taking in the values of the preceding cycle, certainly introduces a theoretical error. However, this error in practice is negligible, taking into account the rate of correction applied to each cycle, and the reduced dimension of the gap relative to the extent of the memory.

The first cycle of the encoder, which will be terminated by the first index pulse, will generally be incomplete. The processing unit (CPU) 13 can either disregard this first incomplete cycle, without performing an analysis or, if it has in memory the number N of position pulses from the encoder for a complete cycle, perform the first analysis when it has received from counter 22 a number pulses which is equal to N.

The processing unit then performs the analysis of the memory and retains in memory the position of the counter at the end of the analysis, a position from which the following analysis will be made, which will be a complete cycle.

The latter then processes the signal and sends the desired correction signal to control circuit 24 of the correction motor, acting on phase shifter 6 to advance or slow down the travel of preprinted web 1 relative to rotary knife 4.

Figure 3:
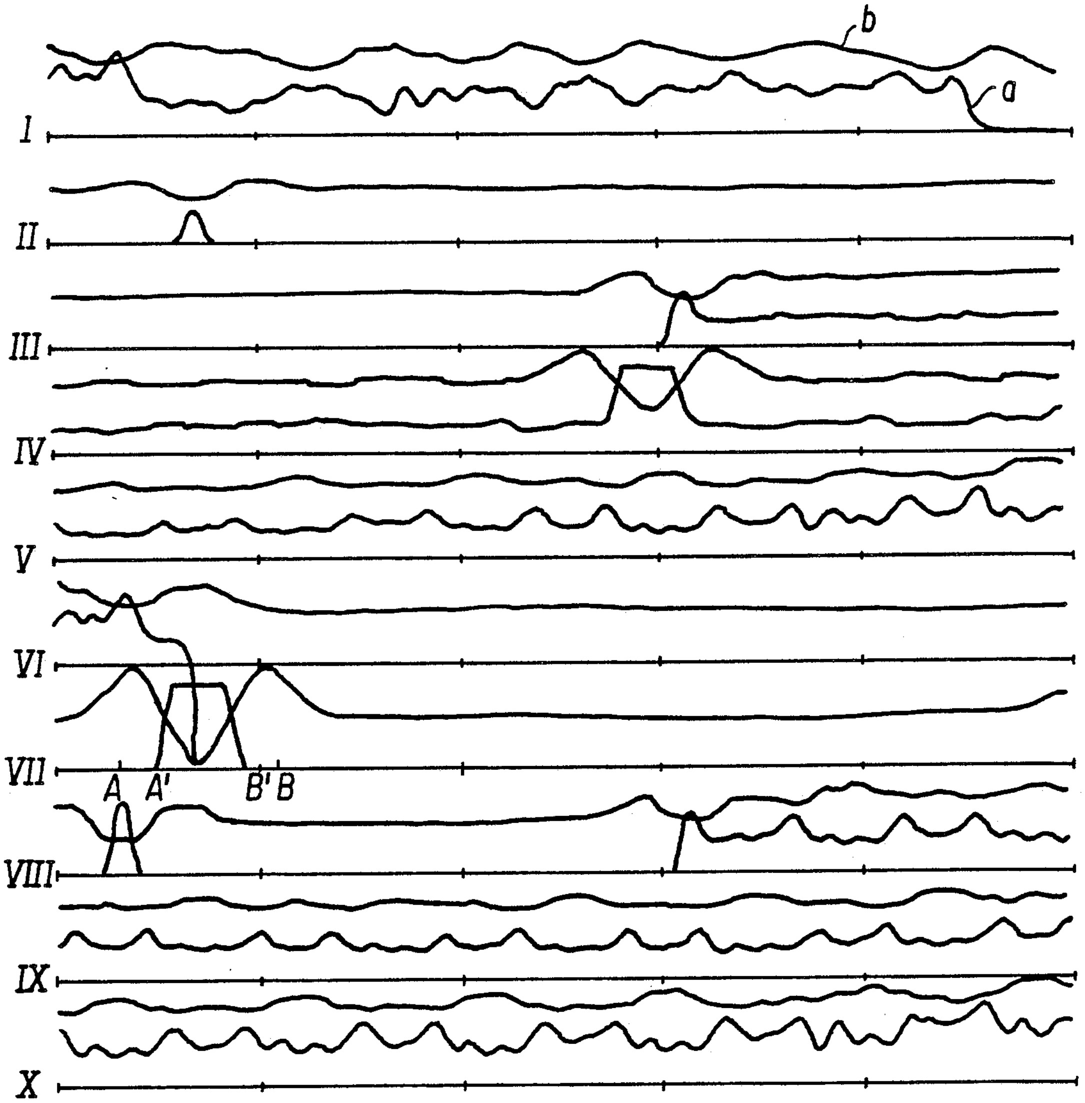
FIG. 3 is a graph representinq the evolution of the detector signal during one cycle and the corresponding evolution of a function of this signal and of the set point signal produced by the selected register mark.

FIG. 3 is a graph showing the evolution curve of the signal of cell 3, at input 21*a* of sampling circuit 21 (curve a), and of the function calculated in processing unit (CPU) 13 (curve b); for ease of representation, horizontal axis a is divided into successive portions I to X, covering together a complete cycle of the rotary knife.

Figure 4:
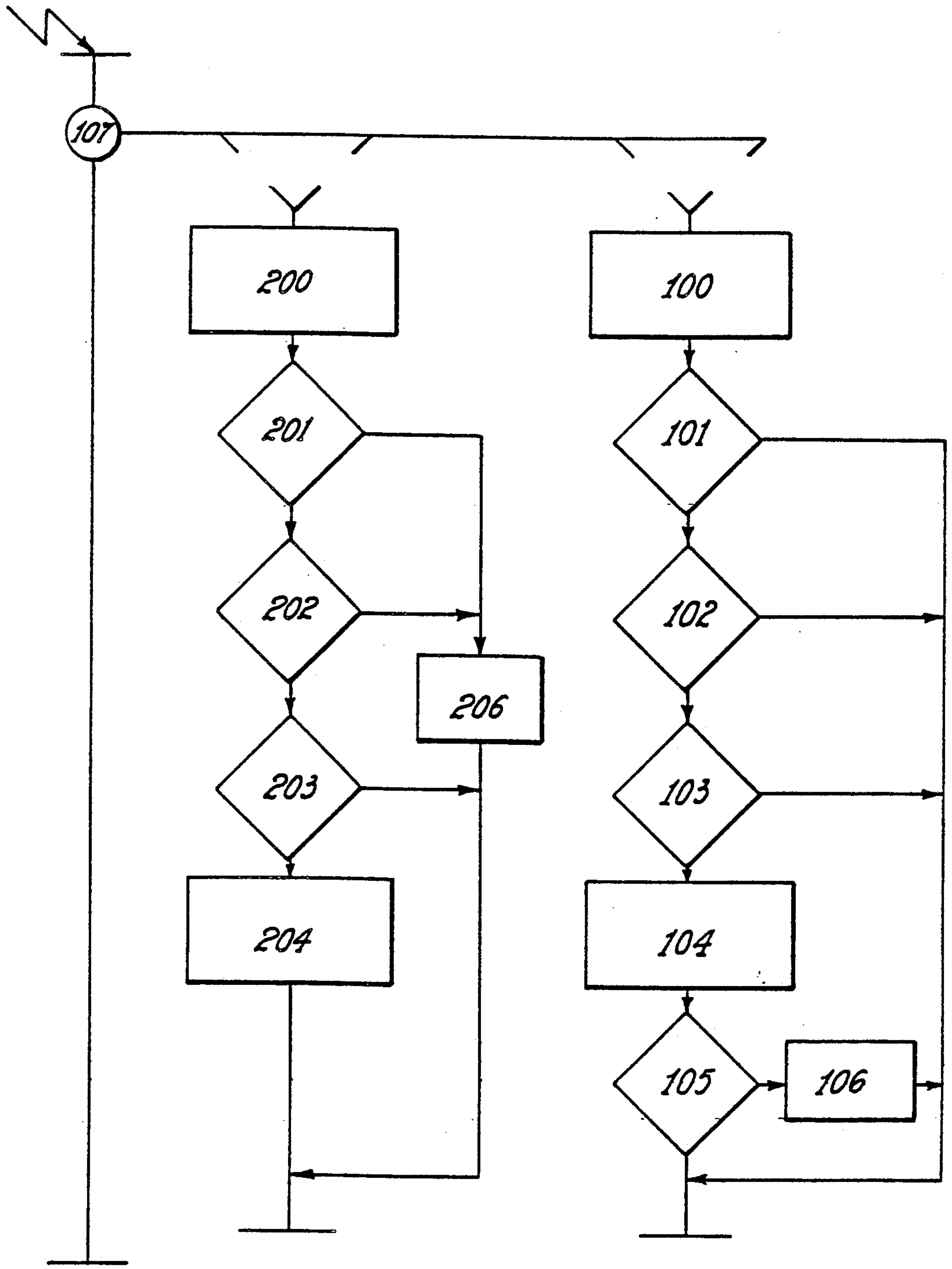
FIG. 4 is a flow chart of the register adjustment process according to the invention.

FIG. 4 is an operational flow chart of the process of the invention operating in two modes, namely, a register adjustment mode and an adjustment mode.

By "register adjustment mode" or "initial register adjustment mode" is understood here the mode of operation in which the contents of entire memory 23, covering one revolution of rotary knife 4, is analyzed to identify and locate the selected register mark. In this mode the register adjustment is automatically made when the machine is started, and it can be the only operating mode in a simplified version of the process.

This register adjustment mode appears in the right part of FIG. 4. In block 100 the contents of the memory are analyzed to identify and locate the sequence of numerical values corresponding to the register mark as defined by the operator.

Block 101 assures validation of the identified register mark; if the register mark is not validated, no action is taken until the following cycle; if the register mark is validated, the processing unit examines the speed of the machine (block 102) to determine if it falls within an optionally prescribed interval of speed (the process of the invention is essentially independent of the speed).

In block 103 the system simply verifies that it has an instruction to operate automatically. Actually, it is useful to provide a deactivation of the register by the operator in certain cases, for example in the presence of a zone of preprinted web of unusable bad quality, for which it is useless to make register adjustments.

In block 104 the system generates the desired correction signal for the phase shifter. In the register adjustment mode, a correction purely proportional to the error is suitable, but, of course, it is possible to provide a correction by means of a PI (proportional-integral) or PID (proportional-integral-derivative) controller; these modes of correction are well known in the art and consequently for simplicity will not be discussed.

In block 105, the error is compared with a predefined error interval; if the error goes outside of the predefined interval, the system continues to operate in the register adjustment mode. If it falls within the interval, the system activates the adjustment mode, by placing the desired set point in block 107.

In the adjustment mode (the left part of FIG. 4), the register mark has been identified and brought into the predefined error interval in block 105. The system is then content with analyzing the memory in the corresponding memory zone to locate the register mark and calculate its position (block 200).

The located register mark is validated or not validated in block 201, its nonvalidation causing the return to the register adjustment mode (block 204).

The register mark being validated in block 201, the system checks the speed of the machine in block 202 to determine if it comes within an optionally prescribed speed interval.

The system then verifies the automatic operation instruction (block 203). As a function of the position calculated in block 200, and in the presence of an actuation instruction in block 203, the system then applies the desired correction signal to the phase shifter motor by a PI (proportional-integral) controller.

The operating mode of the process of this invention will be explained in greater detail below.

On starting the machine for processing the web material, the operator introduces (by his keyboard or other suitable device) into the processor at least the width (in the direction of travel of the web) of a register mark which he has chosen, and optionally its color code, and selects an operating speed of the machine, generally the lowest possible speed of the machine which assures its correct operation.

Ideally, to assure a correct identification and location of the register mark in a simple way, the register mark should be surrounded on both sides by a blank zone. The width of this zone is not critical in itself and is independent of the width of the register mark. As a function of the precision of the calculations of the processing unit (for example, microprocessor with 8, 16 or 32 bits), and of the number of pulses of the encoder per unit of length of the rotary knife (and therefore of the interval of length separating two samplings of signals of the detector), this width should simply be sufficient to furnish a significant number of "zero" numerical values (i.e., actually corresponding to the numerical values associated with the blank material).

This blank zone on both sides of the register mark is used, in the register adjustment mode, to distinguish register marks, of the same color but of different widths.

On the basis of the width the register mark and of the number of pulses of the encoder per cycle, the processing unit calculates the number of samples of the signal, and therefore the corresponding number of memory addresses at which the numerical values should have a value determined by the color code. On both sides of this value, the processing unit associates a number of "zero" values (in the sense mentioned above) corresponding to the predefined blank interval on both sides of the register mark.

The result is a set point register mark in the processing unit, in the form aO bX aO, where a and b represent the width of the blank zone and of the signal respectively, referred to the pulses of the encoder, 0 the numerical value associated with the blank web, and X the numerical value associated with the color code of the register mark.

During passage of the web in the machine, the register samples the detector signal (curve of FIG. 3) in synchronization with the pulses of the encoder (in the simplest case, from each pulse of the encoder, but it is also possible to provide samplings every 2, 3, 4. . . pulses).

Each sample of the analog signal is converted into a numerical value, in an analog-digital converter, and the successive numerical values obtained from one cycle of rotary knife 4 are stored in memory 23, at successive addresses.

At the end of the cycle, the index pulse of the encoder resets counter 22 at zero, the following values are then written in memory starting at the start address, by replacing the preceding values. The analysis process then begins, when the processing unit has received from the counter a position signal corresponding to the end of the preceding analysis.

In the processing unit, this analysis consists, for each successive address i [i varying from xk (address of end of analysis at cycle i−1) to xk−1, considering the memory as a closed loop)], in calculating an evolving function as the sum of the differences in absolute value between numerical value X'y in memory and corresponding numerical value Xy in the set point, over the width of the set point register mark, namely for addresses $y=i-(2a+b)/2$ to $i+(2a+b)/2$. The analysis step can be 1, for maximum precision, but can be content in practical cases with a greater step, for example 2, 3, 4. . . as a function of the printing quality and the width of the register mark, the precision of the processing unit and the nature of the blank background of the material (the uniformity or nonuniformity of the background).

Such a function (curve b of FIG. 3) exhibits a minimum centered on the register mark, framed by two maxima, as is seen more clearly in lines IV and VII of FIG. 3.

During its repetitive analysis of the memory, the register selects the address exhibiting the absolute minimum of function b. The sequence number in the memory of the address kept at the end of scanning is a measurement of the position of the center of the register mark relative to the index pulse of the encoder, from which the position of the center of the register mark relative to the processing tool and therefore the numerical deviation between this position and the zero set point position can easily be drawn.

At this stage, the processing again verifies that the register mark, which it has identified, is a valid register mark, by comparing the value of the minimum obtained to a threshold value, on both sides of zero. If the identified register mark does not meet this condition, the register adjustment process is stopped on this cycle and is resumed at the end of the following cycle of the processing element.

The identified register mark being validated, the register then provides to the motor of the phase shifter a signal proportional to the deviation to assure the correction in a known way.

The error can be displayed continuously on the operator's console so that he can decide at the right moment to increase the speed of the machine to its operating speed. Starting at reduced speed offers the obvious advantage of reducing spoilage because the phase shifter, considering the power and limited speed of its motor, allows a greater correction per cycle at slow machine speed.

When the deviation falls below a threshold value on both sides of the set point position, the register goes into the adjustment mode.

In this adjustment mode, the register mark has already been identified and located in a predefined interval, and the corrections to be made at this stage are small.

Analysis of memory 23 is limited here to an analysis of the zone corresponding to a predefined interval. The processing unit will initiate the analysis here when the position signal of counter 22 indicates to it that the sampling is extended to the end of the interval concerned, and will extend its analysis over said interval, which should be greater than the width of the register mark, increased by the maximum position error admitted in the adjustment mode, on both sides of the ideal position.

Here also a validation of the register mark is desirable to assure that the register mark is indeed in the predefined zone of the memory.

In case of rejection, the processor automatically goes back into the register adjustment mode to analyze the complete contents of the memory.

In case of validation, the position error is provided to a PI controller, which provides the suitable correction signal, in a known way, to the phase shifter, and the operation is repeated in the following cycle.

Referring to FIG. 3, an ideal detector signal is represented between A and B at line VII; this signal comprises a zero level zone, A-A' and B-B' on both sides of a marked amplitude peak and exhibiting a constant amplitude stage. An analog signal, but obtained for a register mark located on a printed zone, appears at line IV, from which it is seen that the signal is non-zero on both sides of the peak.

Such a signal corresponds to the signal of a cell before which a printed mark passes, of a width (in the direction of travel of the web) greater than the width of the beam of the cell; in the case of line VII, the printed mark is separated from the printed format by a blank zone on both sides, while it is buried in a printing format or a uniform colored background in the case of line IV.

The amplitude of the signal is a function of the color of the register mark, and optionally of its length (direction perpendicular to the direction of travel of the web) and its width (direction of the travel of the web), if the latter are less than the length and width of the beam of the photoelectric cell; in practice, however, arrangement is generally made for the length and width of the register mark to be greater than the corresponding dimensions of the beam of the cell, so that these parameters do not intervene in the process.

As can be realized from FIG. 3, line IV, the process of the invention makes possible the identification of a register mark of desired width on a uniform background, curve b exhibiting for this register mark the characteristic evolution with a marked minimum, separated by two maxima, the minimum, however, having, in the case where the background is colored, a value deviating from a zero value more than in the case where the background is white.

For this case it is possible to provide, on the operator's console, a background color code input, making it possible to adjust the value "0" of the sequence aO bX aO from a set point value to a value corresponding to that generated by the background signal of the web. This brings the value of the minimum to zero.

The process of the invention also makes it possible, thanks to placing into the set point the register mark in the form of a numerical sequence, to select a register mark from the printed format itself, provided it is sufficiently characteristic so as to be recognizable.

However, such a complex register mark cannot go as set point into the register by its sole width and color, but it can do so, for example, by examination by the operator of the contents of memory 23 after a cycle of the machine, to determine the zone of minimum width exhibiting the desired characteristic uniqueness, the contents of this zone of the memory then being transferred into the set point.

The process is, of course, not limited to the example of application described, relating to a processing machine with rotary knife, but applies to any process in which a web passes in synchronization relative to a tool (rotary or not) working on a cycle, and whose position can be defined relative to an encoder or the like placed on its drive shaft.

It easily applies to machines performing different processings, each station being provided with its own register (optionally working on different register marks) and compensation loops being provided for the web between each station.

Also it is not limited to the mathematical function described as an example.

Thus, the processing unit can calculate in the register adjustment mode a function other than the minimum function described, for example, a function exhibiting a maximum at the location of the register mark.

The mode of correction used, proportional or by proportional-integral controller in itself is not part of the invention, these types of corrections being well known in the art.

Analysis of the memory need no longer be done at each cycle, but can be done every 2, 3, 4. . . N cycles. In this case, as in the case of adjustment operation, with a window, the analysis can always be initiated at the same address, the "gap" problem not being posed.

Also, although an embodiment has been described with a single memory, in which writing must be interrupted during the reading period for purposes of analysis by the processing unit (CPU), it is, of course, evident for one skilled in the art that it is possible to use the process of the invention by using, for example, two memories used alternately for reading and writing. In this case, the numerical values are written in the first memory, while reading is done in the second, during a cycle, while in the following cycle the reading is done in the first, and writing in the second. Such use also eliminates the "gap" problem mentioned above.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A process of register adjustment or maintenance of a continuous printed web of material in a processing station of a machine in which a position pulse train is produced whose relative position with regard to an index pulse, is a measurement of the instantaneous position of a processing element, of said processing station, during each of its cycles a detector signal is picked up from a printed format on the web continuously and which is a function of a difference of characteristic between the material that makes up said web and the printed format on said web that is carried thereon, wherein the signal from the detector is sampled during one of said cycles, in synchronism with the position pulses, and wherein signals which are the result of said sampling are written in a memory, in a numerical form at successive address therein, with a register mark being selected from said memory contents and said that the deviation between a real position and a set point position of the register mark is determined, and from the deviation thus determined, the desired correction is applied to bring the deviation to zero, comprising in that, to permit an automatic initial register adjustment and maintenance of register of a preprinted web in an off-line machine, the steps of:

storing, in the form of a digital sequence, at least one characteristic of the register mark selected, acting on said detected signal;

continuously sampling the detected signal and writing the results in memory;

periodically analyzing the contents of the memory to locate in it a sequence of numerical values corresponding best to that determined as a function of the register mark selected, and calculating any deviation between the actual position and the set point position of the register mark from a determined address of said sequence and from the position of the processing element associated with it.

2. A process according to claim 1, wherein said characteristics of the register mark selected are its width, in the direction of travel of the preprinted web, and its shape;

and calculating from its width a number of position pulses, and therefore of memory addresses, for which said register mark extends, and determining a sequence of theoretical numerical values for the sampled detector signal from its shape.

3. A process according to claim 1, or 2, wherein:

each index pulse causes the writing in memory of the subsequent numerical values to the successive addresses, whose origin is the start address of the memory.

4. A process according to claim 3, wherein analysis of the memory contents comprises calculating, in a first register adjustment mode, or initial register adjustment, at each address of the memory and over the extent of a complete cycle of the machine, from the central address of the sequence considered, a function of the sequence of the theoretical numerical values and of the sequence of actual numerical values, exhibiting a minimum or a maximum when the detected register mark exhibits the same width and the same shape or color as the predefined register mark, and in retaining the minimum of the minima or the maximum of the maxima associated with the corresponding address, the latter representing said desired central address.

5. A process according to claim 4, wherein analysis of the memory contents for a given cycle (i) begins after writing in memory, during this cycle, of the numerical value to which address (Xk) of the memory has been assigned which is the last of those corresponding to the analysis period, and therefore of nonwriting, of the preceding cycle (i−1), and the analysis is directed toward numerical values covering a cycle of the machine, and going from the following address (Xk+i) to said address (Xk), considering the memory as a closed loop.

6. A process according to claim 1, wherein:

said characteristics of the selected register mark are its width, in the direction of the travel of the preprinted web, and its color, and calculating from its width a number of position pulses, and therefore the number of memory addresses, for said register mark extends; and determining a sequence of theoretical numerical values for the sampled detector signal from its color.

7. A process according to claim 3, further comprising an adjustment zone extending over an interval exhibiting a predefined maximum deviation on both sides of the theoretical position of the register mark relative to the processing element and, when the correction has brought the register mark into this zone, the memory contents are analyzed, in a second adjustment mode, over a corresponding reduced zone.

8. A process according to claim 7, wherein the deviation between the closest value and the theoretical value is compared, and when this deviation is greater than a predefined value, the adjustment mode is deactivated to analyze the entire memory content.

9. An apparatus for the automatic register adjustment and maintenance of a continuous printed web bearing a repeat length printed format, in an off-line web processing machine comprising:

position pulses and index generating means coupled to the processing means of said web processing machine for generating position and index pulses;

a means for adjusting the registration of the repeat length printed format on the web relative to the processing means based upon a difference signal;

means for continuously scanning the web to produce a scanner output signal and for digitizing said output signal into a plurality of data samples, synchronously with the position pulses;

means for storing the digitized data samples for the length of the printed format on the web;

means for selecting and storing a register mark on the printed format on the web in the form of a digital sequence;

processing means for periodically analyzing the contents of the data samples storage means and locating therein a digital sequence corresponding best to that selected and stored for the register mark, and for calculating from the so located register mark deviations between the actual position and the desired set point of the register mark, and correction signal generating means coupled to said processing means for generating said difference signal for said adjusting means.

* * * * *

UNITED STATES PATENT AND TRADEMARK OFFICE
CERTIFICATE OF CORRECTION

PATENT NO. : 4,994,975

DATED : February 19, 1991

INVENTOR(S) : Marc G. MINSCHART

It is certified that error appears in the above-identified patent and that said Letters Patent is hereby corrected as shown below:

In Col. 12, line 9 (claim 1), delete "said that."

Signed and Sealed this

Twenty-ninth Day of December, 1992

*Attest:*

DOUGLAS B. COMER

*Attesting Officer*

*Acting Commissioner of Patents and Trademarks*